United States Patent
Liao et al.

(10) Patent No.: US 11,494,648 B2
(45) Date of Patent: Nov. 8, 2022

(54) METHOD AND SYSTEM FOR DETECTING FAKE NEWS BASED ON MULTI-TASK LEARNING MODEL

(71) Applicant: Harbin Institute of Technology (Shenzhen), Shenzhen (CN)

(72) Inventors: Qing Liao, Shenzhen (CN); Hao Han, Shenzhen (CN); Ye Ding, Shenzhen (CN); Shuhan Qi, Shenzhen (CN); Lin Jiang, Shenzhen (CN); Xuan Wang, Shenzhen (CN)

(73) Assignee: HARBIN INSTITUTE OF TECHNOLOGY (SHENZHEN), Shenzhen (CN)

(*) Notice: Subject to any disclaimer, the term of this patent is extended or adjusted under 35 U.S.C. 154(b) by 393 days.

(21) Appl. No.: 16/749,160

(22) Filed: Jan. 22, 2020

(65) Prior Publication Data
US 2020/0342314 A1    Oct. 29, 2020

(30) Foreign Application Priority Data

Apr. 26, 2019   (CN) .......................... 201910354263.5

(51) Int. Cl.
| G06F 16/9038 | (2019.01) |
| G06F 16/9035 | (2019.01) |
| G06F 40/284 | (2020.01) |
| G06F 40/205 | (2020.01) |
| G06F 9/30 | (2018.01) |
| G06K 9/62 | (2022.01) |
| G06N 3/08 | (2006.01) |
| G06N 3/04 | (2006.01) |

(52) U.S. Cl.
CPC .......... *G06N 3/08* (2013.01); *G06F 9/30036* (2013.01); *G06F 16/9035* (2019.01); *G06F 16/9038* (2019.01); *G06F 40/205* (2020.01); *G06F 40/284* (2020.01); *G06K 9/623* (2013.01); *G06K 9/6267* (2013.01); *G06N 3/0454* (2013.01)

(58) Field of Classification Search
CPC .... G06N 3/08; G06N 3/0454; G06F 9/30036; G06F 40/284; G06F 16/9035; G06F 16/9038; G06F 40/205; G06K 9/6267; G06K 9/623
See application file for complete search history.

(56) References Cited

U.S. PATENT DOCUMENTS

2019/0179861 A1*  6/2019  Goldenstein .......... G06F 16/367

* cited by examiner

*Primary Examiner* — Kevin Ky
(74) *Attorney, Agent, or Firm* — -Tutunjian & Bitetto, P.C.

(57) ABSTRACT

A method, a system, and a computer program product for detecting fake news based on a multi-task learning model. In an embodiment, a multi-task learning model is used to perform joint training on authenticity detection and topic classification of news to be detected, and authenticity of the news to be detected and a topic of the news to be detected are returned simultaneously. Through the implementation of the embodiment of the present invention, the authenticity of the news and the topic of the news can be detected simultaneously, and the accuracy of fake news detection and topic classification is improved.

4 Claims, 5 Drawing Sheets

Use a multi-task learning model to perform joint training on authenticity detection and topic classification of news to be detected, and simultaneously return authenticity and a topic of the news to be detected    ~S101

S101 — Use a multi-task learning model to perform joint training on authenticity detection and topic classification of news to be detected, and simultaneously return authenticity and a topic of the news to be detected

METHOD AND SYSTEM FOR DETECTING FAKE NEWS BASED ON MULTI-TASK LEARNING MODEL

CROSS-REFERENCE TO RELATED APPLICATIONS

The present application claims priority to Chinese Patent Application No. 201910354263.5 to Liao et al., filed Apr. 26, 2019, entitled "Method And System For Detecting Fake News Based On Multi-Task Learning Model", and incorporates its disclosure herein by reference in its entirety.

TECHNICAL FIELD

In some implementations, the current subject matter relates to the technical field of news detection, and in particular to a method and system for detecting fake news based on a multi-task learning model.

BACKGROUND

Social media is a double-edged sword for dissemination of news. On the one hand, the social media is cost-effective and easy to access, features rapid dissemination, and allows users to consume and share news. On the other hand, it can produce harmful fake news, namely some low-quality news intentionally containing incorrect information. The rapid spread of fake news has great potential harm to society and individuals. For example, in the 2016 U.S. presidential election, the most popular fake news spread more widely on Facebook than on mainstream media.

Therefore, fake news detection in social media has attracted wide attention of researchers and politicians. However, fake news detection in social media has unique characteristics and presents new challenges.

First of all, the content of fake news is intentionally created to mislead readers, which makes it difficult to judge whether it is fake news according to the content of the news. Therefore, auxiliary information such as users' activity on social media is needed to distinguish fake news from real news.

Second, users' social activities based on fake news produce a large amount of incomplete, unstructured and noisy data, which makes it very difficult to use the data.

In the research process of the prior art, the inventor of the present invention found that an existing fake news detection method mainly focuses on extracting lexical features from news text content to predict its authenticity, and when the news text content is short, the accuracy is not satisfactory.

In order to detect fake news comprehensively and accurately, many fact checking agencies and social media platforms have invested a lot of manpower and material resources to promote the improvement of relevant algorithms and technological development of fake news detection. Unfortunately, the foregoing problems are still not well solved.

SUMMARY

In view of the technical problem to be solved by the present invention, a method and system for detecting fake news based on a multi-task learning model are provided, which can simultaneously detect the authenticity and a topic of news to be detected, and improve the accuracy of fake news detection and topic classification.

In order to solve the foregoing problems, embodiments of the present invention provide a method for detecting fake news based on a multi-task learning model, including:
  using a multi-task learning model to perform joint training on authenticity detection and topic classification of news to be detected, and simultaneously returning authenticity and a topic of the news to be detected.

Preferably, the multi-task learning model includes an embedding layer, a representation layer and a multi-task layer; where
  the embedding layer embeds text content and contextual information of the news to be detected into a low-dimensional space as original data to obtain a mathematical vector representation of the text content and the contextual information, and inputs the mathematical vector representation into the representation layer;
  the representation layer uses a gated recurrent unit (GRU) layer and a convolutional neural network (CNN) model to extract text features from text embedded word vectors, uses another CNN model and a context feature vector layer to extract context features from context embedded vectors, and combines the extracted text features and context features into complete features; and
  the multi-task layer performs joint training on authenticity detection and topic classification of the news to be detected according to the complete features so as to complete the authenticity detection task and the topic classification task simultaneously and output an authenticity tag and a topic tag.

Preferably, the embedding layer embeds each word in the statement of the news to be detected into a low-dimensional space, each word obtaining a word vector with a fixed length, and embeds information, such as a name of an author of the news to be detected, a political party which the author belongs to and a location, in the low-dimensional space to obtain a low-dimensional vector with a fixed length, namely a representation of mathematical input.

Preferably, the representation layer uses the GRU layer as a feature extractor to extract text features, obtains a representation of a group of text features by max-pooling of the output of the GRU layer, and at the same time uses the CNN to capture features output by the GRU layer to obtain another group of text features; splices context feature vectors obtained from the embedding layer to obtain a representation of a group of context features, and at the same time uses the CNN to capture a correlation between the contextual information to obtain a representation of another group of context features; and combines the extracted text features and the extracted context features to obtain a representation of complete features of the news to be detected.

Embodiments of the present invention also provide a system for detecting fake news based on a multi-task learning model, including:
  a detection unit, configured to use a multi-task learning model to perform joint training on authenticity detection and topic classification of news to be detected, and simultaneously return authenticity and a topic of the news to be detected.

Preferably, the multi-task learning model includes an embedding layer, a representation layer and a multi-task layer;
  the embedding layer embeds text content and contextual information of the news to be detected into a low-dimensional space as original data to obtain a mathematical vector representation of the text content and the contextual information, and inputs the mathematical vector representation into the representation layer;

the representation layer uses a GRU layer and a CNN model to extract text features from text embedded word vectors, uses another CNN model and a context feature vector layer to extract context features from context embedded vectors, and combines the extracted text features and context features into complete features; and the multi-task layer is configured to perform joint training on authenticity detection and topic classification of the news to be detected according to the complete features so as to complete the authenticity detection task and the topic classification task simultaneously and output an authenticity tag and a topic tag.

Preferably, the embedding layer is specifically configured to embed each word in the statement of the news to be detected into a low-dimensional space, each word obtaining a word vector with a fixed length, and embed information, such as a name of an author of the news to be detected, a political party which the author belongs to and a location, in the low-dimensional space to obtain a low-dimensional vector with a fixed length, namely a representation of mathematical input.

Preferably, the representation layer is specifically configured to use the GRU layer as a feature extractor to extract text features, obtain a representation of a group of text features by max-pooling of the output of the GRU layer, and at the same time use the CNN to capture features output by the GRU layer to obtain another group of text features; splice context feature vectors obtained from the embedding layer to obtain a representation of a group of context features, and at the same time use the CNN to capture a correlation between the contextual information to obtain a representation of another group of context features; and combine the extracted text features and the extracted context features to obtain a representation of complete features of the news to be detected.

The embodiment of the present invention has the following beneficial effects:

Through implementation of the embodiments of the present invention, a multi-task learning model is used to perform joint training on authenticity detection and topic classification of news to be detected, and authenticity and a topic of the news to be detected are returned simultaneously. Through the foregoing solution, the authenticity and the topic of the news to be detected can be simultaneously detected, and the accuracy of fake news detection and topic classification is improved.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following clearly and completely describes the technical solutions in the embodiments of the present invention with reference to accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

It should be understood that when used in this specification and the appended claims, the terms "comprise" and "include" indicate the presence of described features, wholes, steps, operations, elements and/or components, but do not exclude the presence or addition of one or more of other features, wholes, steps, operations, elements, components, and/or sets thereof.

It should also be understood that the terms used in the specification of the present invention are for the purpose of describing specific embodiments only and are not intended to limit the present invention. As used in the specification of the present invention and the appended claims, the singular forms "a", "an" and "the" are intended to include the plural forms unless the context clearly indicates otherwise.

It should also be further understood that the term "and/or" as used in the specification of the present invention and the appended claims refers to one or any combination or all possible combinations of more of items listed in association, and includes these combinations.

Figure 1:
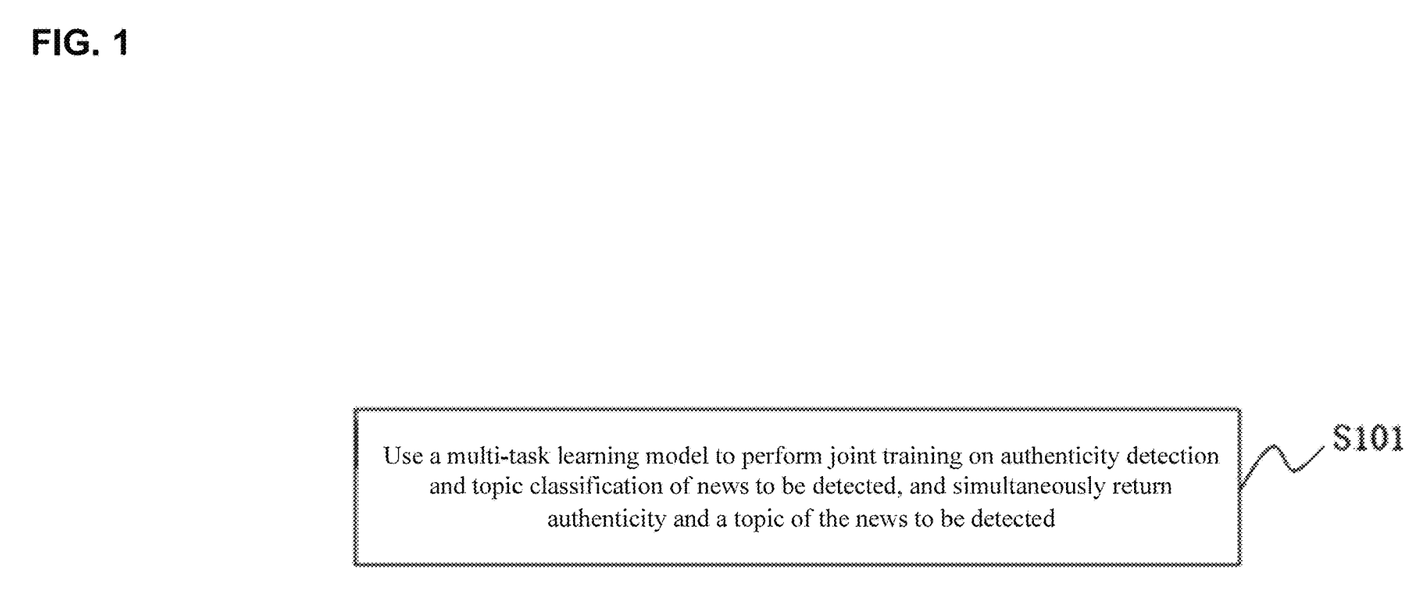
FIG. 1 is a schematic flow chart of a method for detecting fake news based on a multi-task learning model provided by an embodiment of the present invention.

Refer to FIG. 1.

A method for detecting fake news based on a multi-task learning model includes:

S101: use a multi-task learning model to perform joint training on authenticity detection and topic classification of news to be detected, and simultaneously return authenticity and a topic of the news to be detected.

Figure 2A:
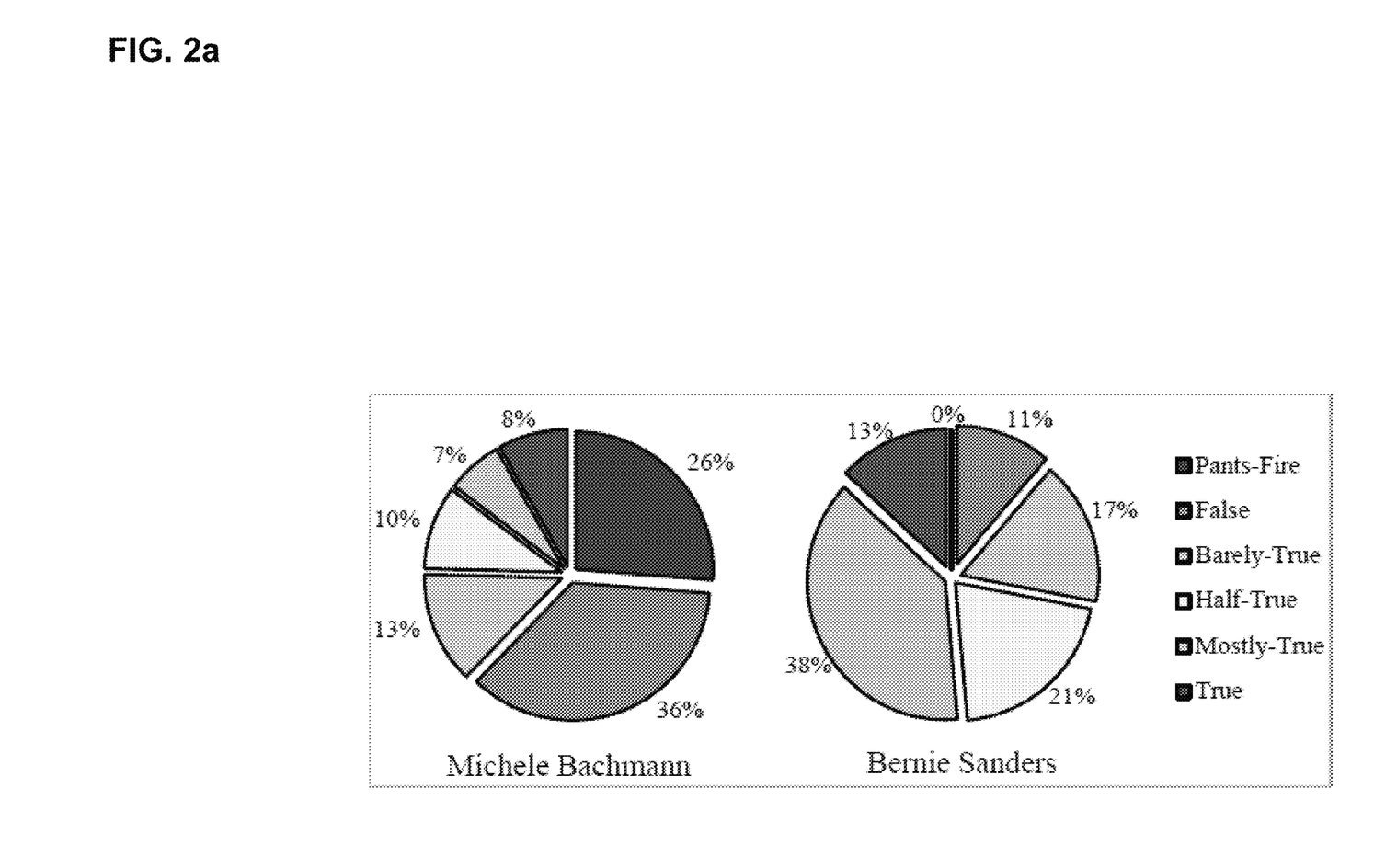
FIGS. 2a-2b are schematic diagrams of credibility distribution of news on different topics and by different authors provided by an embodiment of the present invention.
Figure 2B:
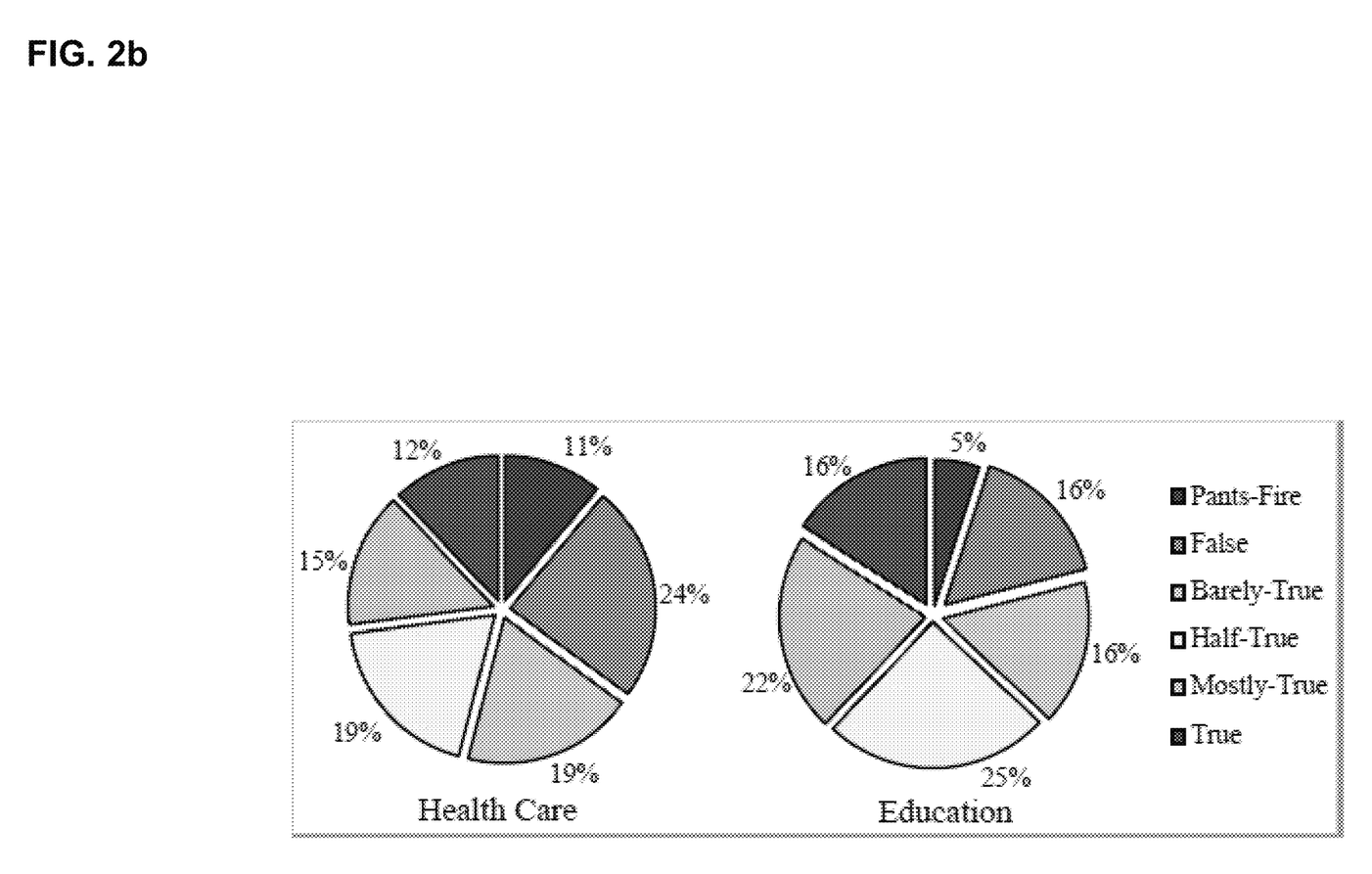

As shown in FIGS. 2a-2b, provided is a schematic diagram of credibility distribution of news on different topics and by different authors. As can be seen from FIGS. 2a-2b, news on certain specific topics has a higher probability of being classified as fake news. Similarly, some authors may also be classified as having high intention to publish fake news.

For some non-ignorable relationships between news authenticity and news topics, this embodiment adopts an integrated multi-task learning model (namely an FDML model) to perform joint training on authenticity detection and topic classification of news to be detected to improve accuracy of fake news detection.

It should be noted that in the FDML model of this embodiment, a fake news detection task and a news topic classification task are synchronously trained and learned in a unified way.

In a preferred embodiment, in order to facilitate the description of subsequent technical solutions, some terms in the FDML model are defined first, specifically as follows:

1) News.

Let a set $D=\{d_1, d_2, \ldots, d_{|D|}\}D=\{d_1, d_2, \ldots, d_{|D|}\}$ contain news $|D|$, for each piece of news $d=\{x, C\}$, x denotes the text content of the news, and c denotes contextual information corresponding to the text content of the news.

2) News Tags.

Each piece of news has a tag $y=\{y^{m=1}, y^{m=2}\}$ related thereto, where $y^{m=1}$ donates a topic tag of the news, and $y^{m=2}$ denotes an authenticity tag of the corresponding news. In order to facilitate the subsequent description, indexes are marked, that is, m=1 donates a topic classification task, and m=2 donates a fake news detection task. In the FDML model, the fake news detection task and the topic classification task are simultaneously subjected to joint training.

3) Topic Classification.

Given a group of news $D=\{d_1, d_2, \ldots, d_{|D|}\}$ find $\hat{y}^{m=1}$ as each piece of unmarked news, and then $\hat{y}^{m=1} = y^{m=1}$.

4) Fake News Detection.

Given a group of news $D=\{d_1, d_2, \ldots, d_{|D|}\}$ find $\hat{y}^{m=2}$ as each piece of unmarked news, and then $\hat{y}^{m=2} = y^{m=2}$. It should be noted that for the problem of fake news detection, the topic tag $\hat{y}^{m=1}$ of the news is not necessarily a message related to the news $d=\{x,c\}$.

5) Multi-Task Fake News Detection.

Given a group $D=\{d_1, d_2, \ldots, d_{|D|}\}$, find a model F that can predict both the topic tag $\hat{y}^{m=1}$ and the authenticity tag $\hat{y}^{m=2}$ of the news $d=\{x, C\}$, where $$F_d = \{\hat{y}^{m=1} \hat{y}^{m=2}\} = \{y^{m=1}, y^{m=1}\} = y.$$

Figure 3:
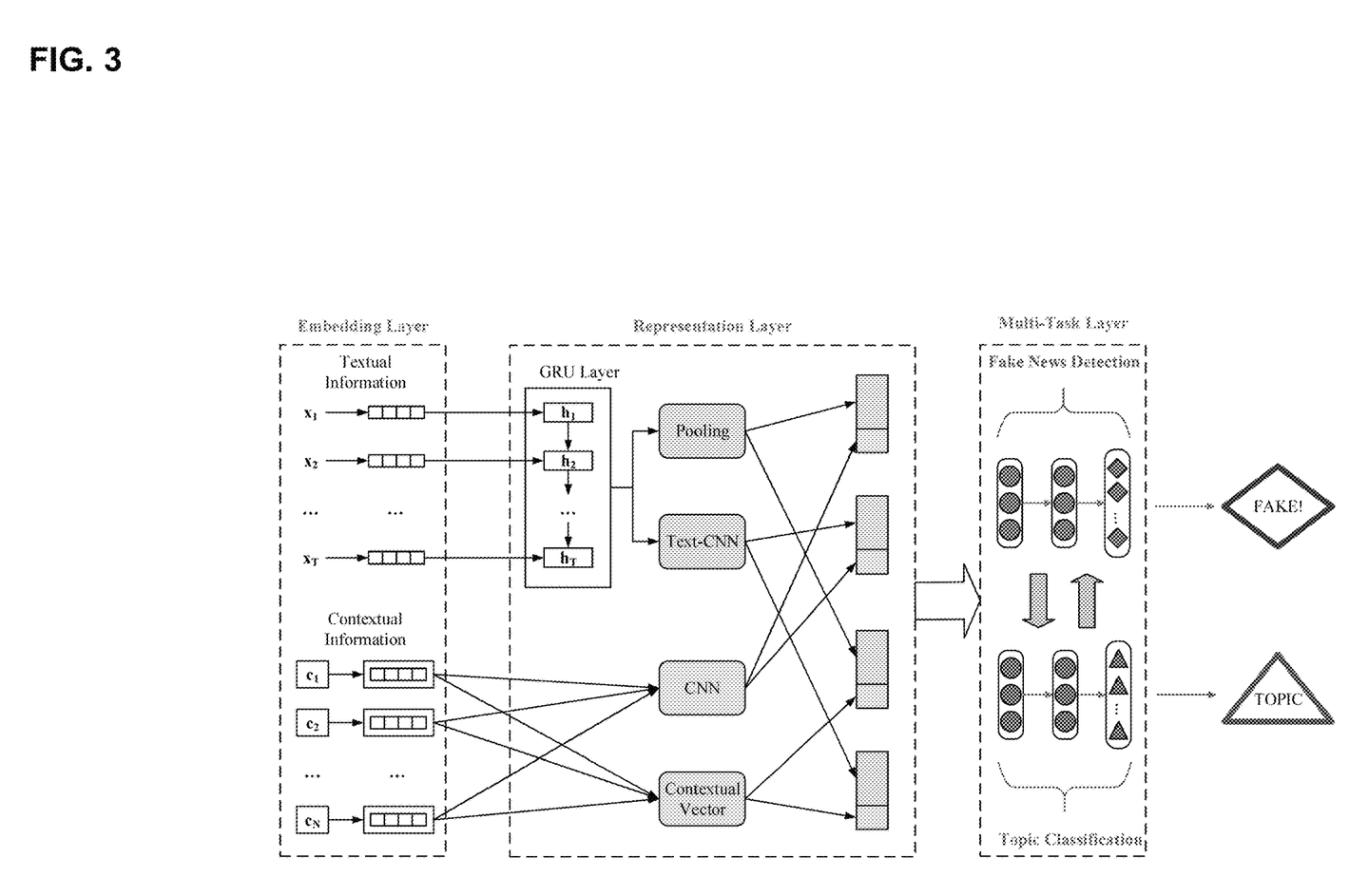
FIG. 3 is a schematic diagram of a fake news detection multi-task learning (FDML) model provided by an embodiment of the present invention.

Refer to FIG. 3.

The multi-task learning model includes an embedding layer, a representation layer and a multi-task layer.

The embedding layer embeds text content and contextual information of the news to be detected into a low-dimensional space as original data to obtain a representation of mathematical vectors of the text content and the contextual information, and inputs the mathematical vectors into the representation layer.

Specifically, the embedding layer embeds each word in the statement of the news to be detected into a low-dimensional space, each word obtaining a word vector with a fixed length, and embeds information, such as a name of an author of the news to be detected, a political party which the author belongs to and a location, in the low-dimensional space to obtain a low-dimensional vector with a fixed length, namely a representation of mathematical input.

The representation layer uses a GRU layer and a CNN model to extract text features from text embedded word vectors, uses another CNN model and a context feature vector layer to extract context features from context embedded vectors, and combines the extracted text features and context features into complete features.

The representation layer can perform training and learning on a fake news detection task and a topic classification task simultaneously.

For text feature vectors of news, the FDML model first uses the GRU layer as a feature extractor to encode the text content to obtain a higher-order representation. At the same time, max-pooling and the CNN model are further applied to the output of the GRU layer to capture high-order features. Finally, the FDML model expresses the extracted text features as subsequent inputs of a fake news detector and a topic classifier respectively.

Meanwhile, the representation layer uses another CNN model and a context feature vector layer to capture a representation of features of contextual information of news. Finally, the FDML model expresses the extracted features of the contextual information as subsequent inputs of the fake news detector and the topic classifier respectively.

Finally, the extracted text features and the extracted context features are combined into complete features according to representation forms, and the complete features are input to the multi-task layer for further processing.

It should be noted that one of the two CNN models applied in the representation layer is suitable for text feature extraction of the text content of news, and the other is suitable for context feature extraction of contextual information of the news. Both are different designs.

The multi-task layer performs joint training on authenticity detection and topic classification of the news to be detected according to the complete features so as to complete the authenticity detection task and the topic classification task simultaneously and output an authenticity tag and a topic tag.

Understandably, for the multi-task layer, since the authenticity detection and topic classification of the news to be detected are jointly trained, that is, the two tasks are executed simultaneously, the output of the topic tag and the output of the authenticity tag affect each other.

Figure 4:
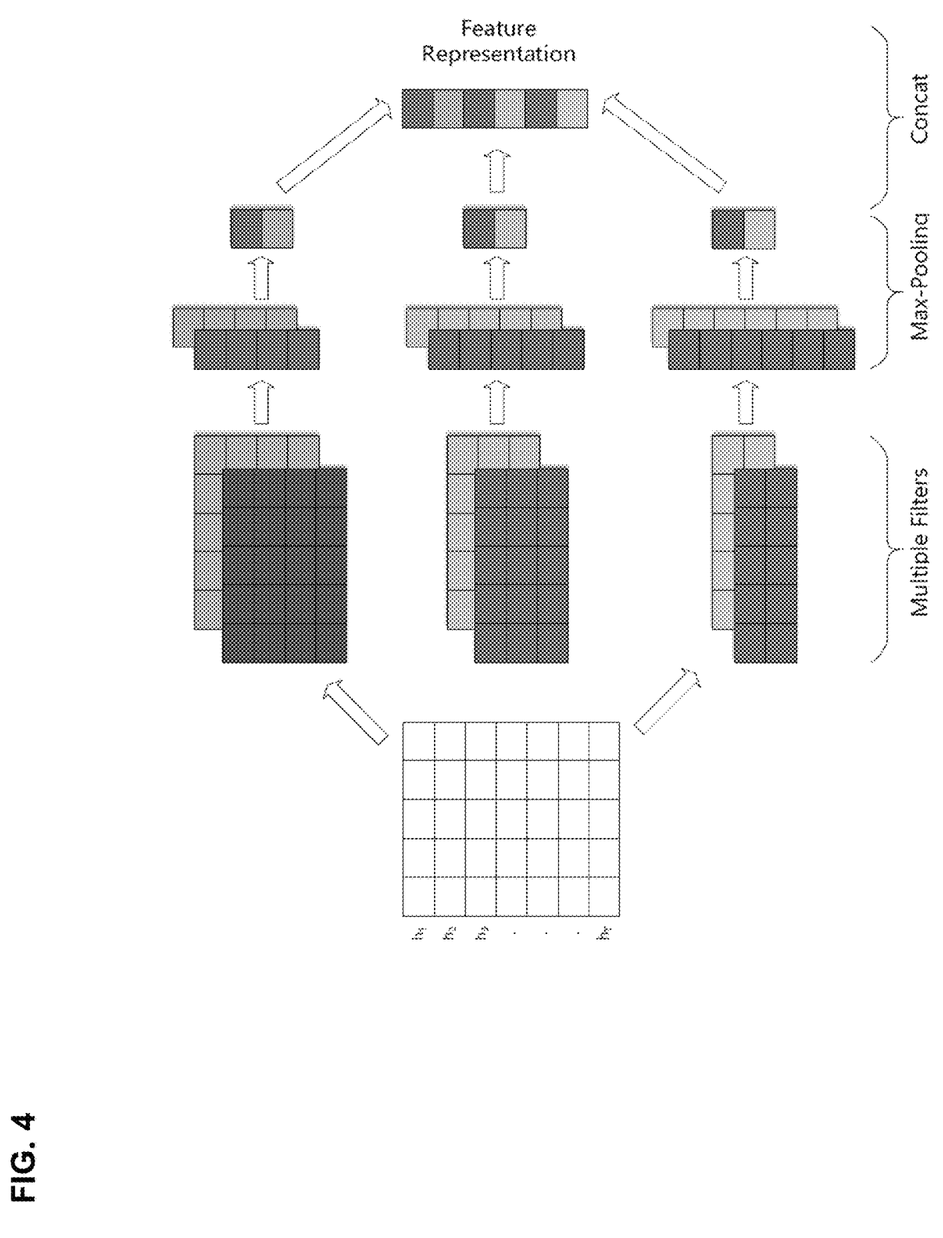
FIG. 4 is a schematic diagram of a Text-CNN model for extracting text features provided by an embodiment of the present invention.

Refer to FIG. 4.

In a preferred embodiment, a piece of news consists of text content and contextual information. The text content refers to news text, such as "Virginia governor Ralph Northam defies calls to resign over racist photo", namely text such as title, abstract, newsletter or statement. The contextual information refers to metadata of news, for example, published by "Jonathan Martin" on "Feb. 2, 2019" on "New York Times", namely metadata such as author, time, location or periodical.

The text content can be regarded as a list, so existing word embedding methods, such as word2vec, fastText and GloVe, can be directly used. Each word is represented as a low-dimensional vector because the low-dimensional vector can effectively encode semantic information. Considering that T words $\{x_1, x_2, \ldots, x_T\}$ are it contained, the purpose of word embedding is to generate a vector with a fixed length, which is represented by a variable length sequence x and trained by some deep neural networks, such as the RNN or the CNN.

Different from the text content, context content is categorical and cannot match contextual information semantically when exiting. Therefore, for the contextual information, an embedding model is necessarily trained in the learning process. In addition, because each category is different, such as author, publisher, time, domain and word distribution, separation needs to be performed by category to be, for example, $\{c_1, c_2, \ldots, c_N\}$, to train embedded feature vectors, as shown in FIG. 3.

In a preferred embodiment, the representation layer uses the GRU layer as a feature extractor to extract text features, obtains a representation of a group of text features by max-pooling of the output of the GRU layer, and at the same time uses the CNN to capture features output by the GRU layer to obtain another group of text features; splices context feature vectors obtained from the embedding layer to obtain a representation of a group of context features, and at the same time uses the CNN to capture a correlation between the contextual information to obtain a representation of another group of context features; and combines the extracted text features and the extracted context features to obtain a representation of complete features of the news to be detected.

When the text content of news is short, it is difficult to detect the authenticity of the news. For this problem, traditional fake news detection methods cannot give a more satisfactory solution.

In order to solve this problem, this embodiment adds contextual information to the text content to assist in the investigation of fake news. Because the contextual information is also useful for topic classification, the contextual information is also used for the topic classification.

In the FDML model, the extracted text features and the extracted context features are combined into complete features and input to the fake news detector and the topic classifier.

It is unable to rely on the traditional RNN for effective capture for a long time, and thus this embodiment uses the GRU as a text feature extractor. For each time step t, the process of calculating the GRU is described as follows:

$$x_t' = Ex_t'$$

$$r_t = \sigma(W_r x_t' + U_r h_{t-1})$$

$$z_t = \sigma(W_z x_t' + U_z h_{t-1})$$

$$h_t' = \tan h(W_h x_t' + U_h(h_{t-1} \cdot r_t))$$

$$h_t = (1-z_t) \cdot h_{t-1} + z_t \cdot h_t'$$

where $x_t'$ donates a word embedding vector of a word $x_t$, E is a word embedding matrix, $r_t$ is a reset gate, $z_t$ is an update gate, and (W,U) is a parameter in the GRU.

As shown in FIG. 3, a hidden state representation $\{h_1, h_2, \ldots, h_T\}$ for effectively encoding text content (topic information) is calculated at the GRU layer, and features of the hidden state of the GRU are extracted by using multiple convolution kernels. Convolution computation is performed by using the convolution kernel $w \in R$ pk, where k is a parameter of the hidden state, and the multiple convolution kernels are used to extract features from the hidden state of the GRU.

Given a hidden state region $h_{i:i+p-1}$ with a length r, then $u_i = f(w \cdot h_{i:i+p-1} + b)$, where b is a bias term and f is a non-linear function. According to the hidden state of the GRU in each region, a feature map can be obtained:

$$u = [u_1, u_2, \ldots, u_{T-r+1}].$$

As shown in FIG. 4, it is shown that Text-CNN has 2/3/4 filtering regions, and each filtering region is equipped with 2 filters.

In order to capture the dependency relationship between contextual information, this embodiment uses another CNN to perform similar operations. However, an embedded vector of contextual information rather than the hidden state $\{h_1, h_2, \ldots, h_T\}$ of the GRU layer is input.

Considering that the author's credit history represents the author's credibility and has been presented as a carrier, it does not participate in the foregoing calculation process, but performs serial operation with the contextual information to form the final representation form of the contextual information for fake news detection. In form, $$s^{m=2} = CNN([c_1, c_2, \ldots, c_N]) \oplus Ch$$

where Ch is a credit record.

For the topic classification task, this embodiment only needs to connect N embedded vectors to represent contextual information. In form, $$s^{m=1} = c_1 \oplus c_2 \oplus \ldots \oplus c_N$$

In a preferred embodiment, complete features are obtained, that is, a fully connected layer is implemented for fusing text features and context features. The execution of the multi-task layer is described as follows:

$$\hat{y}_m = \text{Soft max}(w_2^m \cdot f(w_1^m r^m + b_1^m) + b_2^m)$$

where $(w_1^m, w_2^m)$ is the weight of the fully connected layer, $(b_1^m, b_2^m)$ is the corresponding bias, f is an activation function, $r^m = v^m \oplus s^m$, and $\oplus$ donates serial operation.

A loss function is a linear combination of fake news detection and topic classification;

$$L = CE(\hat{y}^{m=1}, y^{m=1}) + CE(\hat{y}^{m=2}, y^{m=2}) + \lambda \|\Theta\|_2^2$$

where θ donates a model parameter and λ is a regularization coefficient for weighing the model parameter.

Through implementation of any of the foregoing embodiments, according to the following phenomena:

1) the probability of some topics in news design being classified as fake news is very high;
2) some authors have high intention to publish fake news, the FDML model effectively integrates text content and contextual information, and makes use of the correlation between news topics, credibility distribution of authors and authenticity of news to carry out multi-task learning and improve the accuracy of fake news detection.

Embodiments of the present invention also provide a system for detecting fake news based on a multi-task learning model, including:

a detection unit, configured to use a multi-task learning model to perform joint training on authenticity detection and topic classification of news to be detected, and simultaneously return authenticity and a topic of the news to be detected.

As shown in FIGS. 2a-2b, provided is a schematic diagram of credibility distribution of news on different topics and by different authors. As can be seen from FIGS. 2a-2b, news on certain specific topics has a higher probability of being classified as fake news. Similarly, some authors may also be classified as having high intention to publish fake news.

For some non-ignorable relationships between news authenticity and news topics, this embodiment adopts an integrated multi-task learning model (namely an FDML model) to perform joint training on authenticity detection and topic classification of news to be detected to improve accuracy of fake news detection.

It should be noted that in the FDML model of this embodiment, a fake news detection task and a news topic classification task are synchronously trained and learned in a unified way.

Refer to FIG. 3.

The multi-task learning model includes an embedding layer, a representation layer and a multi-task layer.

The embedding layer embeds text content and contextual information of the news to be detected into a low-dimensional space as original data to obtain a representation of mathematical vectors of the text content and the contextual information, and inputs the mathematical vectors into the representation layer.

Specifically, the embedding layer embeds each word in the statement of the news to be detected into a low-dimensional space, each word obtaining a word vector with a fixed length, and embeds information, such as a name of an author of the news to be detected, a political party which the author belongs to and a location, in the low-dimensional space to obtain a low-dimensional vector with a fixed length, namely a representation of mathematical input.

The representation layer uses a GRU layer and a CNN model to extract text features from text embedded word vectors, uses another CNN model and a context feature vector layer to extract context features from context embedded vectors, and combines the extracted text features and context features into complete features.

The representation layer can perform training and learning on a fake news detection task and a topic classification task simultaneously.

For text feature vectors of news, the FDML model first uses the GRU layer as a feature extractor to encode the text content to obtain a higher-order representation. At the same time, max-pooling and the CNN model are further applied to the output of the GRU layer to capture high-order features. Finally, the FDML model expresses the extracted text features as subsequent inputs of a fake news detector and a topic classifier respectively.

Meanwhile, the representation layer uses another CNN model and a context feature vector layer to capture a representation of features of contextual information of news. Finally, the FDML model expresses the extracted features of the contextual information as subsequent inputs of the fake news detector and the topic classifier respectively.

Finally, the extracted text features and the extracted context features are combined into complete features according to representation forms, and the complete features are input to the multi-task layer for further processing.

It should be noted that one of the two CNN models applied in the representation layer is suitable for text feature extraction of the text content of news, and the other is suitable for context feature extraction of contextual information of the news. Both are different designs.

The multi-task layer performs joint training on authenticity detection and topic classification of the news to be detected according to the complete features so as to complete the authenticity detection task and the topic classification task simultaneously and output an authenticity tag and a topic tag.

Understandably, for the multi-task layer, since the authenticity detection and topic classification of the news to be detected are jointly trained, that is, the two tasks are executed simultaneously, the output of the topic tag and the output of the authenticity tag affect each other.

Refer to FIG. 4.

In a preferred embodiment, a piece of news consists of text content and contextual information. The text content refers to news text, such as "Virginia governor Ralph Northam defies calls to resign over racist photo", namely text such as title, abstract, newsletter or statement. The contextual information refers to metadata of news, for example, published by "Jonathan Martin" on "Feb. 2, 2019" on "New York Times", namely metadata such as author, time, location or periodical.

The text content can be regarded as a list, so existing word embedding methods, such as word2vec, fastText and GloVe, can be directly used. Each word is represented as a low-dimensional vector because the low-dimensional vector can effectively encode semantic information. Considering that T words $\{x_1, x_2, \ldots, x_T\}$ are it contained, the purpose of word embedding is to generate a vector with a fixed length, which is represented by a variable length sequence x and trained by some deep neural networks, such as the RNN or the CNN.

Different from the text content, context content is categorical and cannot match contextual information semantically when exiting. Therefore, for the contextual information, an embedding model is necessarily trained in the learning process. In addition, because each category is different, such as author, publisher, time, domain and word distribution, separation needs to be performed by category to be, for example, $\{c_1, c_2, \ldots, c_N\}$ to train embedded feature vectors, as shown in FIG. 3.

In a preferred embodiment, the representation layer uses the GRU layer as a feature extractor to extract text features, obtains a representation of a group of text features by max-pooling of the output of the GRU layer, and at the same time uses the CNN to capture features output by the GRU layer to obtain another group of text features; splices context feature vectors obtained from the embedding layer to obtain a representation of a group of context features, and at the same time uses the CNN to capture a correlation between the contextual information to obtain a representation of another group of context features; and combines the extracted text features and the extracted context features to obtain a representation of complete features of the news to be detected.

When the text content of news is very short, it is difficult to detect the authenticity of the news. For this problem, traditional fake news detection methods cannot give a more satisfactory solution.

In order to solve this problem, this embodiment adds contextual information to the text content to assist in the investigation of fake news. Because the contextual information is also useful for topic classification, the contextual information is also used for the topic classification.

In the FDML model, the extracted text features and the extracted context features are combined into complete features and input to the fake news detector and the topic classifier.

It is unable to rely on the traditional RNN for effective capture for a long time, and thus this embodiment uses the GRU as a text feature extractor. For each time step t, the process of calculating the GRU is described as follows:

$$x_t' = E x_t'$$

$$r_t = \sigma(W_r x_t' + U_r h_{t-1})$$

$$z_t = \sigma(W_z x_t' + U_z h_{t-1})$$

$$h_t' = \tan h(W_h x_t' + U_h(h_{t-1} \cdot r_t))$$

$$h_t = (1 - z_t) \cdot h_{t-1} + z_t \cdot h_t'$$

where $x_t'$ donates a word embedding vector of a word $x_t$, E is a word embedding matrix, $r_t$ is a reset gate, $z_t$ is an update gate, and (W,U) is a parameter in the GRU.

As shown in FIG. 3, a hidden state representation $\{h_1, h_2, \ldots, h_T\}$ for effectively encoding text content (topic information) is calculated at the GRU layer, and features of the hidden state of the GRU are extracted by using multiple convolution kernels. Convolution computation is performed by using the convolution kernel $w \in R$ pk, where k is a parameter of the hidden state, and the multiple convolution kernels are used to extract features from the hidden state of the GRU.

Given a hidden state region $h_{i:i+p-1}$ with a length r, then $u_i = f(w \cdot h_{i:i+p-1} + b)$ where b is a bias term and f is a non-linear function. According to the hidden state of the GRU in each region, a feature map can be obtained: $u = [u_1, u_2, \ldots, u_{T-r+1}]$.

As shown in FIG. 4, it is shown that Text-CNN has 2/3/4 filtering regions, and each filtering region is equipped with 2 filters.

In order to capture the dependency relationship between contextual information, this embodiment uses another CNN to perform similar operations. However, an embedded vector of contextual information rather than the hidden state $\{h_1, h_2, \ldots, h_T\}$ of the GRU layer is input.

Considering that the author's credit history represents the author's credibility and has been presented as a carrier, it does not participate in the foregoing calculation process, but performs serial operation with the contextual information to form the final representation form of the contextual information for fake news detection. In form, $$s'^{m=2}=CNN([c_1,c_2,\ldots,c_N])\oplus Ch$$

where Ch is a credit record.

For the topic classification task, this embodiment only needs to connect N embedded vectors to represent contextual information. In form, $$s'^{m=1}=c_1\oplus c_2\oplus\ldots\oplus c_N$$

In a preferred embodiment, complete features are obtained, that is, a fully connected layer is implemented for fusing text features and context features. The execution of the multi-task layer is described as follows:

$$\bar{y}_m=\text{Soft max}(w_2^m\cdot f(w_1^m r^m+b_1^m)+b_2^m)$$

where $(w_1^m, w_2^m)$ is the weight of the fully connected layer, $(b_1^m, b_2^m)$ is the corresponding bias, f is an activation function, $r^m=\upsilon^m\oplus s^m$, and $\oplus$ donates serial operation.

A loss function is a linear combination of fake news detection and topic classification;

$$L=CE(\bar{y}^{m=1},y^{m=1})+CE(\bar{y}^{m=2},y^{m=2})+\lambda\|\Theta\|_2^2$$

where $\Theta$ donates a model parameter and $\lambda$ is a regularization coefficient for weighing the model parameter.

Through implementation of any of the foregoing embodiments, according to the following phenomena:

1) the probability of some topics in news design being classified as fake news is very high;
2) some authors have high intention to publish fake news, the FDML model effectively integrates text content and contextual information, and makes use of the correlation between news topics, credibility distribution of authors and authenticity of news to carry out multi-task learning and improve the accuracy of fake news detection.

Those of ordinary skill in the art can understand that all or some of processes for implementing the methods of the foregoing embodiments can be completed by instructing relevant hardware through a computer program. The program may be stored in a computer readable storage medium. When the program is executed, processes of the embodiments of the foregoing methods may be included. The storage medium may be a magnetic disk, an optical disk, a read-only memory (ROM), a random access memory (RAM), or the like.

The descriptions above are preferred embodiments of the present invention, and it should be noted that for those of ordinary skill in the art, various improvements and modifications can be made without departing from the principles of the present invention. These improvements and modifications should also be regarded as falling into the protection scope of the present invention.

What is claimed is:

1. A method for detecting fake news based on a multi-task learning model, comprising:
   using a multi-task learning model to perform joint training on authenticity detection and topic classification of news to be detected, and simultaneously returning authenticity and a topic of the news to be detected;
   wherein the multi-task learning model comprises an embedding layer, a representation layer and a multi-task layer;
   the embedding layer embeds text content and contextual information of the news to be detected into a low-dimensional space as original data to obtain a representation of mathematical vectors of the text content and the contextual information, and inputs the mathematical vectors into the representation layer;
   the representation layer uses a gated recurrent unit (GRU) layer and a convolutional neural network (CNN) model to extract text features from text embedded word vectors, uses another CNN model and a context feature vector layer to extract context features from context embedded vectors, and combines the extracted text features and context features into complete features; and
   the multi-task layer performs the joint training on the authenticity detection and the topic classification of the news to be detected according to the complete features so as to complete an authenticity detection task and a topic classification task simultaneously and output an authenticity tag and a topic tag.

2. The method for detecting fake news according to claim 1, wherein the embedding layer embeds each word in the statement of the news to be detected into a low-dimensional space, each word obtaining a word vector with a fixed length, and embeds information, such as a name of an author of the news to be detected, a political party which the author belongs to and a location, in the low-dimensional space to obtain a low-dimensional vector with a fixed length, namely a representation of mathematical input.

3. The method for detecting fake news according to claim 2, wherein the representation layer uses the GRU layer as a feature extractor to extract text features, obtains a representation of a group of text features by max-pooling of the output of the GRU layer, and at the same time uses the CNN to capture features output by the GRU layer to obtain another group of text features; splices context feature vectors obtained from the embedding layer to obtain a representation of a group of context features, and at the same time uses the CNN to capture a correlation between the contextual information to obtain a representation of another group of context features; and combines the extracted text features and the extracted context features to obtain a representation of complete features of the news to be detected.

4. A computer program product comprising a non-transitory machine-readable medium storing instructions that, when executed by at least one programmable processor, cause the at least one programmable processor to perform operations comprising:
   using a multi-task learning model to perform joint training on authenticity detection and topic classification of news to be detected, and simultaneously returning authenticity and a topic of the news to be detected;
   wherein the multi-task learning model comprises an embedding layer, a representation layer and a multi-task layer;
   the embedding layer embeds text content and contextual information of the news to be detected into a low-dimensional space as original data to obtain a representation of mathematical vectors of the text content and the contextual information, and inputs the mathematical vectors into the representation layer;
   the representation layer uses a GRU layer and a CNN model to extract text features from text embedded word vectors, uses another CNN model and a context feature vector layer to extract context features from context embedded vectors, and combines the extracted text features and context features into complete features; and the multi-task layer is configured to perform the joint training on the authenticity detection and the topic classification of the news to be detected according to the complete features so as to complete an authenticity detection task and a topic classification task simultaneously and output an authenticity tag and a topic tag.

* * * * *